Oct. 31, 1961   E. E. HILDEBRANDT ET AL   3,006,358
SADDLE TYPE FUEL TANK

Filed Aug. 6, 1956   4 Sheets-Sheet 1

E.E. HILDEBRANDT
A.M. STERREN
INVENTORS

BY E. C. McRae
J. R. Faulkner
J. H. Oster

ATTORNEYS

Oct. 31, 1961  E. E. HILDEBRANDT ET AL  3,006,358
SADDLE TYPE FUEL TANK

Filed Aug. 6, 1956  4 Sheets-Sheet 3

E. E. HILDEBRANDT
A. M. STERREN
INVENTORS

BY E. C. McRae
J. R. Faulkner
J. H. Oster

ATTORNEYS

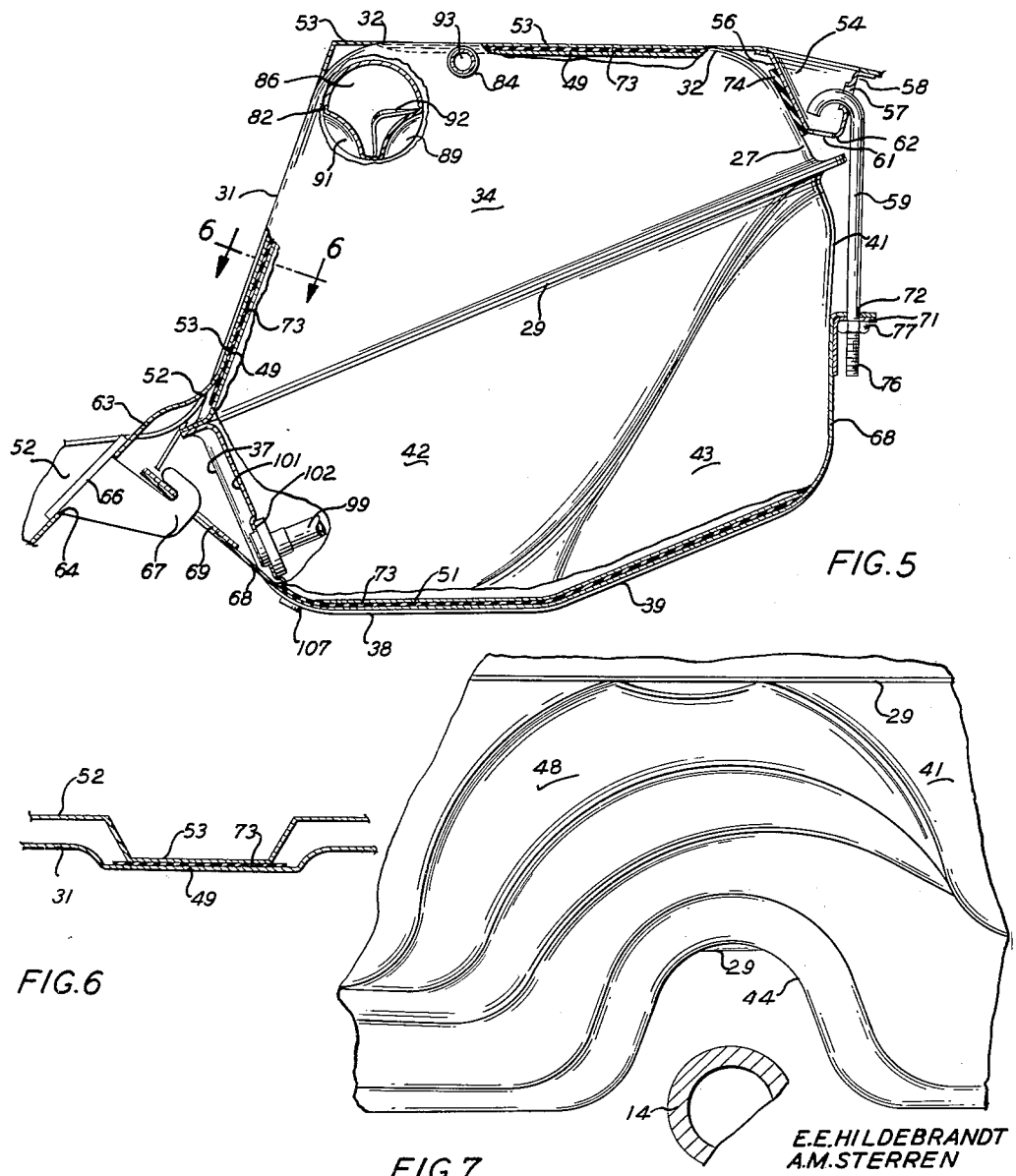

United States Patent Office 3,006,358
Patented Oct. 31, 1961

3,006,358
SADDLE TYPE FUEL TANK
Eugene Edward Hildebrandt, Dearborn, and Arthur Marc Sterren, Detroit, Mich., assignors to Ford Motor Company, Dearborn, Mich., a corporation of Delaware
Filed Aug. 6, 1956, Ser. No. 602,116
4 Claims. (Cl. 137—266)

This invention relates to a novel saddle type tank and arrangement for automotive vehicles and their like.

Prior to this invention it was common practice for the automotive fuel tank to be located below the floor pan of the trunk compartment in the rear of the vehicle disposed rearwardly of and generally in the same plane as the differential carrier. In the modern styling trend of today additional emphasis is placed on the low silhouette of the vehicle thus making it difficult to provide a deep trunk compartment, adequate fuel storage and/or adequate clearance between the fuel tank and the road surface. In the applicants' device, a novelly constructed fuel tank is disposed above and forwardly of the differential carrier and has a tunnel area formed in the underside of the tank to provide a passageway for the propeller shaft connected to the differential carrier and the conventional universal joint. The room formerly occupied by the fuel tank may thus be used for a variety of purposes, including a spare wheel compartment, a retractable top, additional trunk compartment area, et cetera. It is also to be noted that the placing of the tank in the above position further removes it from possible puncture or damage as a result of the vehicle dropping into holes or hitting obstructions.

In addition to the novelly situated and formed fuel tank, provision is made for the equal distribution of fuel into both sides of the tank as well as the equal withdrawal of the fuel by the fuel pump of the vehicle.

One of the objects of this invention, therefore, is to provide a saddle tank disposed upwardly and forwardly of the differential carrier housing.

Still another object is to provide centrally disposed fuel tank allowing free rotational and vertical movement of the propeller shaft and free vertical arcuate movement of the differential carrier.

Still another object is to provide a saddle type tank with an equal flow gasoline filler means and equal flow gasoline withdrawal means.

Still another object is to provide a simply constructed and easily secured fuel tank for use in automotive vehicles and the like.

Other objects and advantages of this invention will be made more apparent as this description proceeds, particularly when considered in connection with the accompanied drawings wherein:

FIGURE 5 is an enlarged end view partly in section showing the attachment of the fuel tank to the underbody.

FIGURE 6 is a sectional view taken on plane 6—6 of FIGURE 5.

FIGURE 7 is an enlarged fragmentary rear view showing the position of the tank with respect to the propeller shaft.

Figure 1:
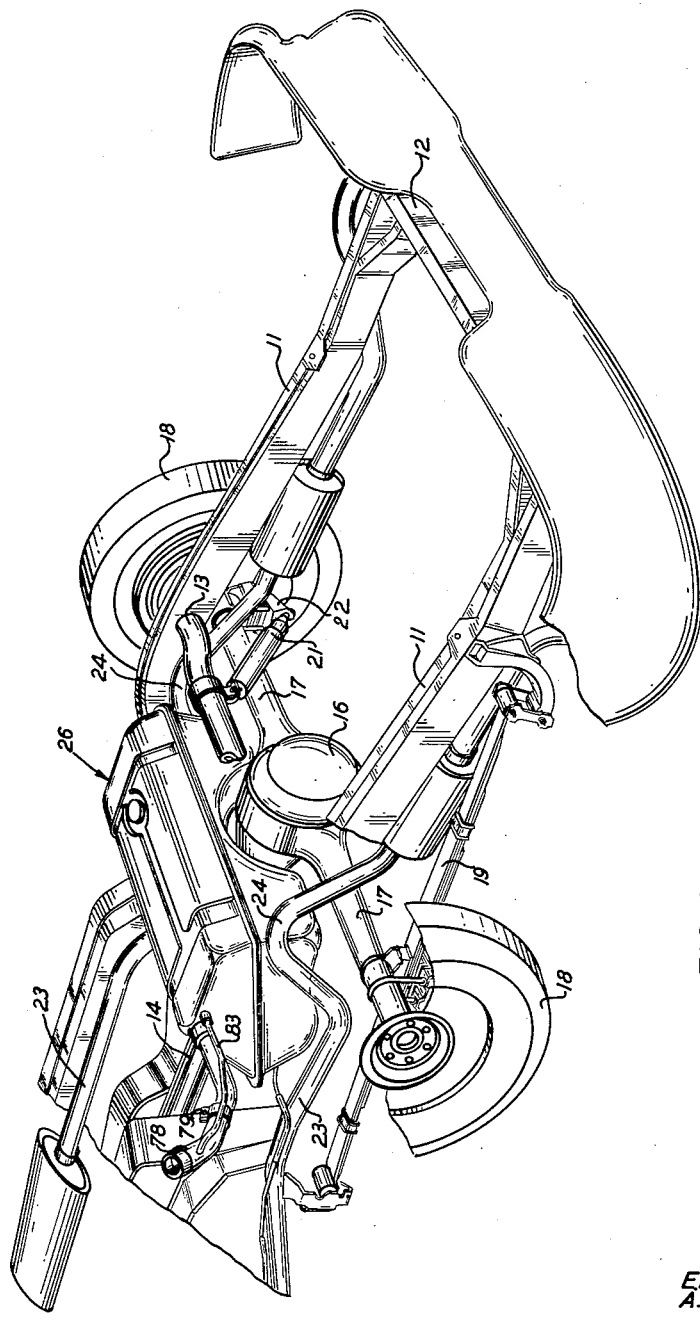
FIGURE 1 is a perspective view of the fuel tank shown in position on the rear section of an automobile chassis.

Referring now to the drawings, FIGURE 1 illustrates generally the rear section of a chassis of a motor vehicle having longitudinally extending frame side members 11 joined at their rearward end by a cross frame member 12. Spaced forwardly of the rear cross frame member 12 is another cross frame member 13 extending generally transversely and secured at its outer ends to the side frame members 11. The cross frame member 13 is tubular in cross section.

Power from the vehicle engine (not shown) is transmitted through a propeller shaft 14 to a conventional differential and drive gearing contained within a central differential carrier housing 16.

The differential carrier housing 16 has integral outwardly extending axle shaft housings 17 which house the axle shafts (not shown) and supports the rear wheels 18. The chassis is resiliently supported on the shaft housings 17 at their outboard ends by conventional leaf springs 19 secured at their outer ends to the frame side members 11 and at its medial position to the housing 17. A shock absorber 21 is secured to the cross member 13 and rear spring clip plate 22 which completes the mounting. It can be seen that the housings 16 and 17 may move vertically with respect to the frame side members 11. A pair of tail pipes 23 extend longitudinally and inwardly of the frame side members and raised upwardly as at 24 for clearance over and above the axle shaft housing 17.

The novel saddle type fuel tank of the applicants' design is generally indicated at 26. It is centrally located between the frame side members 11, the tail pipes 23 and straddles the propeller shaft 14 forwardly and above the differential carrier housing 16. The tank is composed of an upper and lower tank section 27 and 28 having outwardly extending flanges 29 which are seam welded in liquid tight fashion.

The upper tank 27 is trapezoidal in cross section having an upwardly extending forward wall 31, a top 32, descending rear wall 33 and descending side walls 34 and 36.

The lower tank 28 is composed of a downwardly depending forward wall 37, an angled bottom section consisting of a flat bottom section 38 and an upwardly angled rear section 39, an upwardly extending rear wall 41, and a pair of side walls 42. The side walls 42 have an inwardly dished section 43 extending from a point on the rearward end of bottom section 38 and extending angularly upwards and rearwards to a point on the flange 29 inward of the rear wall 41.

Figure 2:
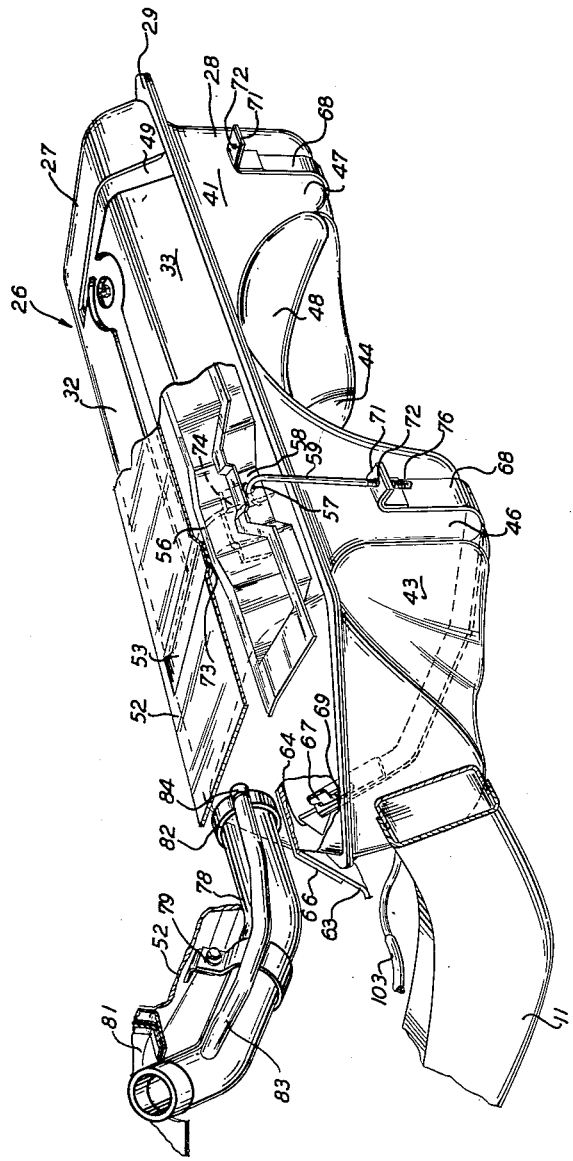
FIGURE 2 is similar to a portion of FIGURE 1 and further illustrates the installation of the tank to the underbody of the vehicle.
Figure 3:
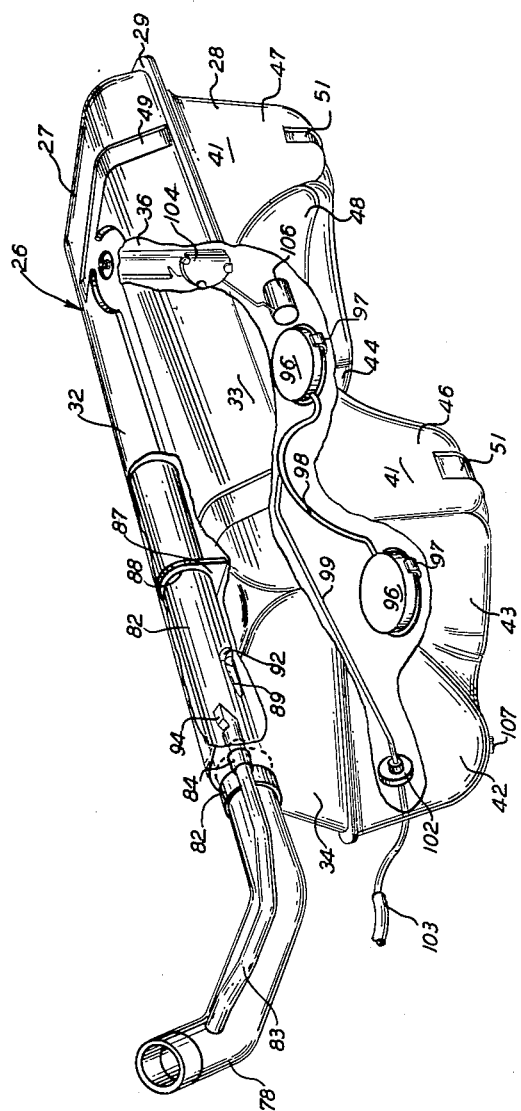
FIGURE 3 is a perspective view of the fuel tank, partly in section showing the internal structure of the fuel tank.

The bottom sections 38 and 39 are raised upwardly at the transverse medial point of the tank to form a tunnel 44 as shown in the FIGURES 2, 3 and 7 and which separates the lower tank 28 into two compartments 46 and 47. In this particular adaptation the tunnel 44 is narrow at the forward wall section 37 and progressively increases in width the length of section 38 at which time it flares radially outwardly to form a bell section 48.

As can be seen in the drawings, bell section 48 generally conforms to the forward portion of the differential housing, whereas the tunnel 44 straddles the propeller shaft 14 and the universal joint (not shown). Sufficient clearance is permitted so that the jouncing movement of the axle with respect to the frame members 11 will not result in the differential carrier housing 16 and propeller shaft 14 striking the gas tank 26. Arcuate fore and aft movement of the housings 16 and 17 will not interfere with the gas tank 26. In FIGURE 1 it can also be seen that the dished section 43 of the lower tank side walls 42 has been so formed to provide clearance for the raised section 24 of the tail pipe assembly 23.

The upper tank 27 has a pair of depressions 49 formed in the forward wall 31, the top section 32 and the rear wall 33. The lower tank 28 has a like depression 51 longitudinally aligned with the depression 49 formed in the bottom sections 38 and 39. The depressions 49 and 51 are used in the centering and attaching of the tank to the vehicle underbody.

Installation of the saddle tank is shown more fully in FIGURES 2 and 5 wherein there is provided an underbody 52 which is secured by conventional means (not shown) to the frame members 11 and 12 at various places.

As can be seen particularly in FIGURE 5, the underbody 52 conforms generally to the forward wall 31 and the top 32 of the upper tank 27 and has a pair of parallel depressions 53 in alignment with the impressions 49 and 51 in the upper and lower tanks 27 and 28. It is to be noted that the depressions 53 are narrower and deeper than the depressions 49 and 51. At the rearward portion of the underbody a transversely extending reinforcement channel 54 is rigidly secured by weldment means to the underside of the underbody 52. The channel 54 has a pair of forwardly protruding downwardly angled projections 56 which are aligned with the depressions 49 in the rear wall 33 of the upper tank 27 and 53 in the underbody 52. An enlarged inwardly formed aperture 57 is provided in the medial section of the vertical depending rear face 58 of the projection 56 to provide an anchor hole for a hook bolt 59.

The underbody 52 has a pair of laterally spaced inwardly dished flat sections 63 provided with a pair of vertical slots 64 through which a T-shaped anchor 66 extends. As can be seen in the drawings, the anchor 66 is disposed in the longitudinal axis of the depressions 53 in the underbody. Each anchor 66 has a hooklike end 67 over which a strap 68 having an enlarged slot 69 is secured. Strap 68 is preformed to fit within the depressions 51 in bottom sections 38 and 39 in the lower tank 28 and has a bent flange 71 with an aperture 72 provided therein at the other end for attachment to the hook bolt 59. Prior to installation of the tank 26 to the underside of the underbody, an insulating tape 73 is adhesively secured in the depressions 49 and 51 of the tank. A pair of resilient pads 74 are also adhesively secured to the forward sections 56 of the channels 54 to provide resiliency in the mounting of the tank to the underbody.

The tank is then installed by centering it against the underside of the underbody so that the depression 49 bears against the underside of the depressions 53 (as shown in FIGURE 5) and the padded forward section of projection 56 (as shown in FIGURES 2 and 5). Straps 68 are placed over hook ends 67 and aligned in the depressions 51 on the underside of the tank. Hook bolts 59 are then positioned in the apertures 57 and have their threaded shank end 76 extend through the aperture 72 in the bent flange 71 and secured by nut means 77.

It can thus be seen that the underbody and the fuel tank are cooperatively formed so that the positioning and attachment of the tank to the underbody is accomplished in a secure but yieldable manner. The top 32 and the bottom section 38 of the tank 26 are substantially parallel to each other so that the fluid level in the compartments 46 and 47 will be in a horizontal plane parallel with the bottom section 38.

Fuel access for the tank is accomplished through a laterally, outwardly and upwardly extending filler pipe 78 which may be secured to the underbody 52 by conventional bolt, nut and bracket means 79. The outermost portion of the filler pipe 78 extends into the quarter panel pocket indicated at 81. The filler pipe 78 is journaled in the filler neck 82 in leak proof fashion by a resilient O ring (not shown). An air vent pipe 83 is secured near the outer portion of the filler tube 78 and is journaled into an inner vent tube 84 in air sealing fashion by means of a resilient O ring (not shown).

The filler neck 82 projects outwardly out of the side wall 34 a small distance and extends inwardly into the tank so that its innermost opening 86 is at a medial position above the tunnel 44. Filler neck 82 is, of course, rigidly secured to the side wall 34 in leak proof fashion and is secured in the area of compartment 46 by a support member 87 shaped to conform with the top 32 and forward wall 31 and having a lower extending edge vertically exposed below the surface of the filler neck. A center aperture 88 permits the extension of the filler neck through the support member 87.

Figure 4:
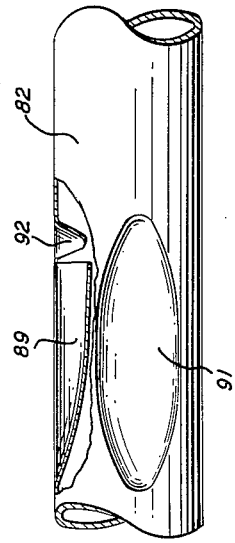
FIGURE 4 is an enlarged fragmentary sectional view of the fuel tank filler neck.

Medially located between the support member 87 and the side wall 34 on the lower side of the filler neck 82 are a pair of elliptical impressions 89 and 91, as shown in FIGURES 3, 4 and 5. Near the inner end of the impression 89 the filler neck 82 is cut and pinched inwardly to form a face 92 which extends to the approximate vertical center line of the impressions 89 and 91. As can be seen in FIGURE 5, face 92 substantially separates the opening between the impressions 89 and 91 into two equal sections so that one-half of the incoming fuel is directed into compartment 46 by the pinched face 92 while the rest of the fuel flows out of the opening 86 into the far compartment 47. Elliptical impressions 89 and 91 effectively concentrate the incoming fuel in the lower section of the filler neck 82 to effectively prevent bobsledding or swirling of fuel. Filling the fuel tank, consequently, is easily accomplished and the fuel is equally divided between the two openly joined compartments 46 and 47. Occasionally, fuel coming out of the opening provided by the pinched face 92 runs down the outer surface of the filler neck 82 toward the far compartment 47. This fuel is effectively stopped by the support member 87 which provides an impediment to the flow, and the fuel will then fall into the inner compartment 46.

The inner vent tube 84 also projects outwardly through the side wall 36 in spaced apart relationship to the filler neck 82. It is fixedly secured to the side wall 34 in liquid tight fashion and has an aperture 93 which permits the appropriate exhausting of air which is displaced by incoming fuel. A bent flange 94 of the inner vent tube 84 permits rigid attachment to the top 32 of the upper tank 27.

Means for removing fuel from the tank 26 is provided in the form of a pair of filter means 96 secured to the flat section 38 of the lower tank 28 in the compartments 46 and 47. They are secured in spaced apart relationship to the bottom section 38 by means of brackets 97 rigidly secured to said bottom section. Filters 96 are joined together by a substantially U-shaped conduit 98 which conforms generally to the tunnel 44. At the uppermost medial portion of the conduit 98 a T connection is made by a conduit 99 which extends forwardly of the tank and downwardly toward an impressed face 101 formed in the forward wall 37 of the lower tank 28. An appropriate liquid tight fitting 102 is secured to the face 101. A conventional fuel line 103 is threadably connected at one end to the fitting 102 and at the other end to the fuel pump (not shown).

The filters 96 and the respective conduits 98 and 99 result in gasoline being taken simultaneously from both compartments of the tank. In the event that one compartment of the tank has received more fuel by reason of the car cornering or jouncing, syphoning of the fuel from the higher level compartment to the lower level compartment automatically takes place until the two compartments have the same fuel level. As long as there is fuel above the openings in the filters 96, there will be an automatic self-leveling of the fuel supply which will result in fuel being removed equally from both sides of the fuel tank. As a result of this self-leveling feature, only one conventional fuel indicator 104 is required, as is shown in section 47 of the tank. This indicator 104 has a float 106 positioned to rise and fall according to the level of the fuel supply in the tank.

Draining of the fuel tank is permitted through a pair of removable threaded plugs 107 located in the compartments 46 and 47 at a lowermost point.

In the instant disclosure the differential driving pinion (not shown) of the differential gearing in the differential carrier housing 16 is located on the longitudinal center line of the carrier. The differential ring gear (not shown), consequently, is located completely on one side of the center line, thus forming an assymmetrical connection. The bell section 48 of the tank 26, therefore, surrounding the differential carrier housing is not symmetrical in shape, as can be seen in FIGURE 7. It is to be understood, however, that the tunnel 44 and the bell shape 48 may be formed to any shape to provide the necessary clearance for the drive line and differential carrier housings as may be needed.

It will be understood that the invention is not to be limited to the exact construction shown and described, but that various changes and modifications may be made without departing from the spirit and scope of the invention, as defined in the appended claims.

What is claimed is:

1. An improved fuel filler construction for a compartmentalized fuel tank for a motor vehicle or the like, said fuel tank having a generally transversely extending upper tank section and a lower tank section secured to said upper tank section, said lower tank section having a medially disposed longitudinally extending tunnel-like section defining a pair of fuel compartments open to each other adjacent the underside of said upper tank section, a single opening in one of the tank sections for the admission of fuel and a second opening in the same tank section for the passage of air, a transversely disposed filler tube in said fuel admission opening and having a portion of its length extending both inwardly and outwardly of the fuel tank, mounting means securing said filler tube to the underside of the upper tank section, a pair of spaced apart inlets in the filler tube defining a fuel inlet for each of said compartments, said first inlet diverting substantially one half of the fuel into one compartment and the second inlet dumping the remaining fuel into the other compartment, a transversely disposed breather tube mounted in said second opening, one end of said breather tube being spaced apart from the inside end of the filler tube and the other end of the breather tube communicating with the outside end of the filler tube.

2. A compartmentalized fuel tank for a motor vehicle or the like, said fuel tank having an upper tank section and a lower tank section, said lower tank section being upwardly formed at a medial point to substantially define a pair of fuel compartments open to each other adjacent to the underside of said upper tank section, means secured to the underside of said upper tank section for admitting fuel into the fuel tank including a filler tube having a portion extending outwardly of said fuel tank and an additional portion extending inwardly of said fuel tank and terminating substantially over the upwardly formed portion of the lower tank section, and a pair of openings in said inner portion whereby incoming fuel is diverted into each of said compartments in substantially equal amounts.

3. An improved fuel filler construction for a compartmentalized fuel tank for a motor vehicle or the like, said fuel tank having a generally transversely extending upper tank section and a lower tank section secured to said upper tank section, said lower tank section having a medially disposed longitudinally extending tunnel-like section defining a pair of fuel compartments open to each other adjacent the underside of said upper tank section, a single opening in one of the tank sections for the admission of fuel and a second opening in the same tank section for the passage of air, a transversely disposed filler tube in said fuel admission opening and having a portion of its length extending both inwardly and outwardly of the fuel tank, mounting means securing said transversely disposed filler tube to the underside of said upper tank section including a vertically downwardly extending support having an enlarged aperture and a lower extending flange, said transversely disposed filler tube being journalled in said aperture, said transversely disposed filler tube extending inwardly a distance to be substantially over the longitudinally extending tunnel, a pair of spaced-apart inlets in the filler tube defining a fuel inlet for each of said compartments, said first fuel inlet diverting substantially one-half of the fuel into one compartment and the second fuel inlet dumping the remaining fuel into the other compartment, a transversely disposed breather tube mounted in said second opening, one end of said breather tube being spaced apart from the inside end of the filler tube and the other end of the breather tube communicating with the outside end of the filler tube, said fuel coming out of the second opening being directed over the highest part of the longitudinally extending tunnel into the other of the fuel compartments.

4. An improved fuel filler construction for a compartmentalized fuel tank for a motor vehicle or the like, said fuel tank having a generally transversely extending upper tank section and a lower tank section secured to said upper tank section, said lower tank section having a medially disposed longitudinally extending tunnel-like section defining a pair of fuel compartments open to each other adjacent the underside of said upper tank section, a single opening in one of the tank sections for the admission of fuel and a second opening in the same tank section for the passage of air, a transversely disposed filler tube in said fuel admission opening and having a portion of its length extending both inwardly and outwardly of the fuel tank, mounting means securing said filler tube to the underside of the upper tank section, said filler tube comprising an open ended cylindrical tube, one of said open ends being disposed within the fuel tank and defining a second inlet of the fuel tank, an elliptical impression on each side of the vertical plane of said tube which includes the longitudinal axis of the filler tube and inwardly spaced from the second inlet and defining a restricted passage therebetween, an opening in one of said impressions having a face portion extending inwardly substantially to the vertical plane of the tube and defining the first inlet to the fuel tank, said face effectively diverting substantially one-half of the incoming fuel into one compartment and the remainder of the fuel through the open end second inlet into the other compartment, a transversely disposed breather tube mounted in said second opening, one end of said breather tube being spaced apart from the inside end of the filler tube and the other end of the breather tube communicating with the outside end of the filler tube.

References Cited in the file of this patent

UNITED STATES PATENTS

| | | |
|---|---|---|
| 417,351 | Anderson | Dec. 17, 1889 |
| 1,551,329 | Ray | Aug. 25, 1925 |
| 1,607,877 | Delery | Nov. 23, 1926 |
| 2,043,223 | Baumes | June 9, 1936 |
| 2,227,278 | Slater | Dec. 31, 1940 |
| 2,330,983 | Mathey | Oct. 5, 1943 |
| 2,389,168 | Snyder | Nov. 20, 1945 |
| 2,459,353 | Woods | Jan. 18, 1949 |
| 2,530,819 | Hamlin | Nov. 21, 1950 |
| 2,557,250 | Baerwald | June 19, 1951 |
| 2,723,680 | Danel | Nov. 15, 1955 |
| 2,779,498 | Cole | Jan. 29, 1957 |
| 2,808,892 | Walker | Oct. 8, 1957 |

FOREIGN PATENTS

| | | |
|---|---|---|
| 410,902 | Germany | Mar. 20, 1925 |
| 555,689 | Germany | July 28, 1932 |
| 648,146 | Great Britain | Dec. 28, 1950 |
| 883,406 | Germany | July 16, 1953 |
| 902,228 | Germany | Jan. 21, 1954 |